(12) United States Patent
Anderson et al.

(10) Patent No.: US 10,043,551 B2
(45) Date of Patent: Aug. 7, 2018

(54) TECHNIQUES TO SAVE OR DELETE A VIDEO CLIP

(71) Applicant: Intel Corporation, Santa Clara, CA (US)

(72) Inventors: Glen J. Anderson, Beaverton, OR (US); Kathy Yuen, Portland, OR (US); Joshua Ekandem, Rex, GA (US); Omesh Tickoo, Portland, OR (US); Ravishankar Iyer, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 102 days.

(21) Appl. No.: 14/750,426

(22) Filed: Jun. 25, 2015

(65) Prior Publication Data

US 2016/0379684 A1    Dec. 29, 2016

(51) Int. Cl.
| | |
|---|---|
| *H04N 5/77* | (2006.01) |
| *H04N 9/80* | (2006.01) |
| *G11B 27/11* | (2006.01) |
| *G11B 27/34* | (2006.01) |
| *G11B 27/031* | (2006.01) |
| *G06K 9/00* | (2006.01) |
| *H04N 21/422* | (2011.01) |
| *H04N 21/4223* | (2011.01) |
| *H04N 21/433* | (2011.01) |
| *H04N 21/44* | (2011.01) |
| *H04N 21/472* | (2011.01) |
| *H04N 21/8549* | (2011.01) |
| *H04N 5/76* | (2006.01) |
| *G11B 27/28* | (2006.01) |

(52) U.S. Cl.
CPC .......... *G11B 27/11* (2013.01); *G06K 9/00751* (2013.01); *G11B 27/031* (2013.01); *G11B 27/28* (2013.01); *G11B 27/34* (2013.01); *H04N 5/76* (2013.01); *H04N 21/4223* (2013.01); *H04N 21/42202* (2013.01); *H04N 21/4334* (2013.01); *H04N 21/44008* (2013.01); *H04N 21/47205* (2013.01); *H04N 21/8549* (2013.01)

(58) Field of Classification Search
USPC ................................ 386/239–248, 278–290
See application file for complete search history.

(56) References Cited

U.S. PATENT DOCUMENTS

| | | | |
|---|---|---|---|
| 2009/0006082 A1* | 1/2009 | Harris | ............... G06F 17/30743 704/201 |
| 2012/0052972 A1 | 3/2012 | Bentley | |

(Continued)

FOREIGN PATENT DOCUMENTS

KR    20090112349    10/2009

OTHER PUBLICATIONS

International Search Report and Written Opinion received for PCT Patent Application No. PCT/US2015/034171, dated Sep. 8, 2016, 18 pages.

*Primary Examiner* — Hung Dang

(57) ABSTRACT

Examples include a determination how to manage storage of a video clip generated from recorded video based upon a sensor event. Managing storage of the video clip may include determining whether to save or delete the video clip based on an imprint associated with an object that indicates whether the object is included in the video clip.

24 Claims, 11 Drawing Sheets

Recording Event 522

(56) References Cited

U.S. PATENT DOCUMENTS

| | | | |
|---|---|---|---|
| 2013/0251332 A1* | 9/2013 | Giacomelli | G06Q 30/02 386/228 |
| 2014/0371885 A1* | 12/2014 | Ianni | G06K 9/00342 700/91 |
| 2015/0043886 A1 | 2/2015 | Bang et al. | |
| 2015/0103164 A1 | 4/2015 | Kallstrom et al. | |
| 2015/0154452 A1* | 6/2015 | Bentley | G06K 9/00711 386/201 |
| 2015/0227784 A1* | 8/2015 | Roy | G06T 7/0097 382/103 |
| 2016/0225410 A1* | 8/2016 | Lee | G11B 27/10 |
| 2016/0295157 A1 | 10/2016 | Cho et al. | |

* cited by examiner

TECHNIQUES TO SAVE OR DELETE A VIDEO CLIP

RELATED CASE

This application is related to commonly owned U.S. patent application Ser. No. 14/459,229 filed on Aug. 13, 2014, entitled "Techniques and Apparatus for Editing Video".

TECHNICAL FIELD

Examples described herein are generally related to techniques for managing video content.

BACKGROUND

Recording of video is ubiquitous as the proliferation of devices equipped with video recording capabilities expands to encompass portable computers, netbooks, tablet computers, cell phones, smart phones, phablets, wearable devices such as watches, glasses, and mountable video recording devices or components. Because of the increased density of storage media, and the ability to stream video efficiently between devices, even relatively small devices may be equipped to record and store videos that may have durations of several minutes or more.

However, such recorded videos may often remain unprocessed after recording and storing due to the relatively cumbersome task of editing video content, which may be time consuming and may not be conveniently performed on most or at least some devices. Although professional editing may be performed to produce a more enjoyable video content based upon user-recorded video, the number of videos that are recorded by an amateur user and the expense associated with professional editing may preclude this choice except in very special circumstances.

DETAILED DESCRIPTION

Figure 1A:
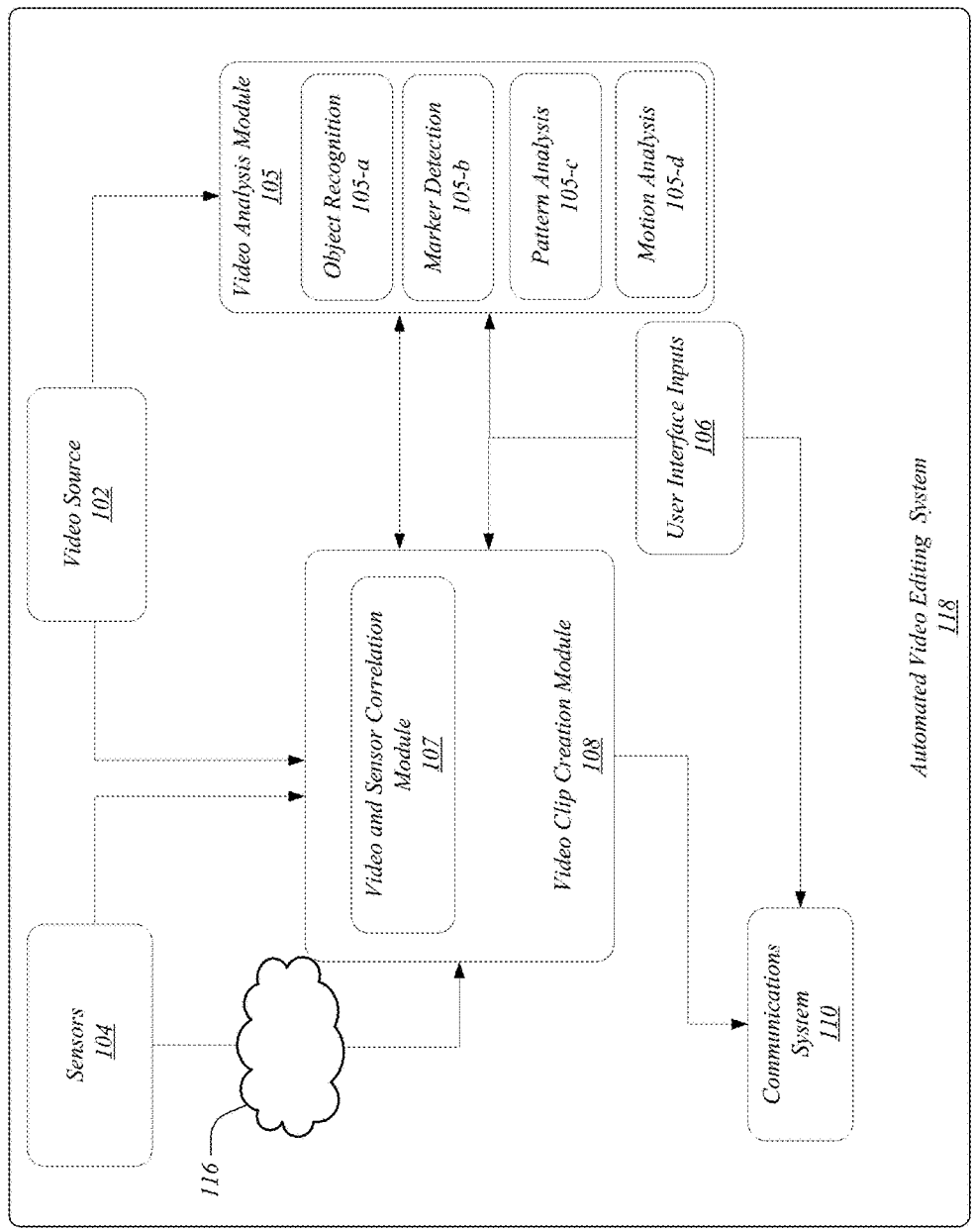
FIG. 1A illustrates an example of a first automated video editing system.

As contemplated in the present disclosure, and as mentioned above, increasing amounts of long duration video or even a high quantity of shorter, randomly recorded video may be cumbersome or time consuming to edit. Cumbersome and/or time consuming editing in order to whittle down recorded video to video clips having smaller durations and more interesting video content may discourage most amateur video recorders from even attempting to edit recorded video. Further, higher costs associated with professional editing may additionally discourage editing of recorded video. As a result, in a large number of instances, non-edited amateur videos that are recorded in a wide variety of settings, such as sporting events, holidays, gatherings, meetings, and the like, may accumulate and may be rarely enjoyed after recording.

One possible solution to facilitate creation of smaller duration video content that is more interesting includes use of automated video editing through wearable sensors. This solution proposed that video may be automatically edited by generating video clips that correspond to sensor events that exceed a threshold. For example, a user of a video capture device or component may employ a system that monitors sensor data received from sensors located with an object (e.g., a person) being recorded. Video clips may be automatically generated if the sensor data indicates the object was doing something interesting. For example, if an altimeter sensor with the object indicates a rapid change in elevation (e.g., a skier jumping) a video clip may be automatically generated for as long as the sensor event lasts or for a predetermined duration.

The automatic generation of a video clip based only on the sensor event may be problematic in that a video clip may be generated regardless of whether the user of the video recording component was actually recording the object. In other words, the user may be distracted or pointing the video recording component in a direction away from the object when a sensor event occurs. Therefore, the video being recorded does not include the object in a video clip that was automatically generated based on the sensor event. As a result, a video clip that might not be interesting at all to the user may be generated. It is with respect to these and other considerations that the present improvements may be needed.

Examples provide enhancements for editing of videos. Consistent with various examples, systems, techniques and apparatus are provided that may enhance the editing of a video by employing sensor data that may be collected concurrently with the recording of video including an object wearing or located with the sensor generating the sensor data. The sensor data may be used to identify a sensor event or sensor events that form the basis of generating a video clip or video clips.

Various examples exploit the capability of sensor technology that may be deployed across a wide variety of components, both wearable and non-wearable, in order to facilitate automated video editing. Various examples may provide systems and methods to exploit sensor information that may be recorded, received and synchronized with a concurrently recorded video to assist in editing that video. The term "video" as used herein may refer to a digital recording that contains a video track, and may optionally include or be associated with other recorded data, such as an audio track. Unless otherwise noted, the term "video" (also referred to as "recorded video") as used herein may also refer to recorded video that records live activity using a camera, sensor, or other detector, as opposed to a computer-generated video or animation. A video may be recorded in any suitable setting by any suitable recording device or component including a camera, dedicated video camera, computer, portable computer, tablet computer, cell phone, smart phone, phablet, wearable camera, other wearable device such as a head mounted device, digital watch device, or other device. The examples are not limited in this context.

Examples may include a video clip creation module that uses sensor information collected concurrently with video in order to identify instances in a video from which to generate a video clip or video clips. The term "video clip" as used herein may refer to a portion of a recorded video that is less than the entire video, whose duration may be a fixed duration or may be variable. In some instances the duration of a video clip may be on the order of several seconds, or several tens of seconds. However, examples are not limited to video clips of any particular duration.

Examples may also include a video analysis module to receive imprint information to imprint on an object. The term "object" as used herein may refer to a desired focus point or subject for one or more video recording devices or components. For these examples, to imprint on the object may include identifying visual markers such as, but not limited to, a color for the object, a motion of the object or a pattern of the object (e.g., facial recognition). Also, to imprint on the object may be accomplished by a video and sensor correlation module that may be capable of correlating sensor data generated by sensors with the object with video recorded concurrently with the sensor data to determine whether the object is or was recorded.

In some examples, systems and architecture may facilitate efficient computation to generate video clips. For these examples, sensor information may constitute unanalyzed sensor data that is collected concurrently with video from which video clips are to be created. The unanalyzed sensor data may be received by a device that records the video, such that the device may generate video clips from the recorded video, either in real-time, or subsequent to the recording of the video. In other examples, sensor information may constitute sensor data that is collected concurrently with a video and is received and analyzed by a remote device such as a server. The analyzed data may be transmitted to or retrieved by a user device, such as a device that records the video, or other user device. The sensor information may include at least one set of sensor information where a set of sensor information includes one or more items of sensor information. For example multiple sets of sensor information may be collected or receive from multiple sensors concurrently with the recording of a video. A given set of sensor information may be derived, for example, from a data stream composed of multiple items of data that is output over time from a given sensor.

In various examples, a video analysis module, a video clip creation module, and/or a video and sensor correlation module may be embedded in any convenient device such as a user device that records a video. The video analysis module, the video clip creation module, and/or the video and sensor correlation module may be used to imprint on an object, identify a sensor event from a set of sensor information that is received by the user device, generate a video clip based upon the sensor event and then determine whether to save or delete the video clip based on the imprint to the object indicating if the object is included in the video clip.

In some examples, a sensor event that triggers the generation of a video clip may be identified in real-time during recording of video. In other examples, the sensor event may be identified after-the-fact based upon recorded video and sensor information. In still other examples, the occurrence of a sensor event may be used to guide recording of a video in real time. As used herein, the term "sensor event" refers to detected activity based upon sensor data other than video. Examples of sensors that may be employed in accordance with the present examples include accelerometers, gyrometers, position detectors, altimeters, audio detectors, proximity sensors such as radio frequency or infrared proximity sensors, humidity sensors, or other sensors, that can detect characteristics of the environment, people nearby, the person recording and the devices. Examples are not limited in this context. Examples of sensor events include, but are not limited to, a rapid change in an accelerometer reading as a function of time, which may be indicative of a force experienced by a sensor. Other sensor events may include a rapid change in altitude detected by an altimeter as a function of time, a rapid change in audio intensity as a function of time, and so forth. In various examples, a sensor event may be composed of multiple changes that are detected by multiple different sensors at the same time or closely spaced in time, such as two events that occur within several seconds of one another. In addition, a sensor event may have other information associated with the sensor event, such as a time stamp and information concerning an object or entity that triggered the sensor event.

A given sensor event may occur during a concurrent recording of video such that the given sensor event may be temporally correlated or synchronized with the video. Synchronization may be facilitated, for example, with the aid of time stamps that are provided with received sensor data and recorded video. For example, sensor data may be collected and sent with a time stamp. These time stamps may then be associated with a given sensor event and may also be used to synchronize with video that may also be received with its own time stamp, so that a portion of video that is recorded during a given sensor event may be identified. In various examples, sensor data and video from the different components used to record video and sensor data may be synchronized according to known protocols such as network time protocol (NTP).

As detailed below, in accordance with various examples, a determination may be made as to whether and how to generate a video clip from a recorded video based upon a sensor event and then determine whether to save or delete the video clip based on an imprint to an object that may or may not indicate the object is included in the video clip.

FIG. 1A illustrates a block diagram of an automated video editing system 100 according to various examples. The automated video editing system 118 provides a general architecture that may be implemented in different manners to automatically generate video clips from recorded video and then determine whether to delete or save these video clips. As illustrated, a video clip creation module 108 may receive inputs from various components. A video source 102 may provide video to video clip creation module 108 and possibly to video and sensor correlation module 107 either in real time or subsequent to recording of the video. Video source 102 may also provide video to video analysis module 105 to facilitate an imprint on an object. Video source 102 may be a video recording component in some examples, but may also be a separate device that stores video recorded by a video recording component. Sensors 104 may include at least one sensor that is not a video recording component as noted above. Sensors 104 may provide sensor information to video clip creation module 108 that is used to assist in automated video editing of a given video, such as the generation of at least one video clip from the video supplied by video source 102. User interface inputs 106 may also be provided to video clip creation module 108 and/or video analysis module 105 to assist in imprinting on an object, video editing or saving/deleting a video clip as detailed more below.

It is to be noted that video analysis module 105, video and sensor correlation module 107, video clip creation module 108 and other similar components as disclosed below, may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some examples, video clip creation module 108 may be coupled to a communications system 110. As described more below, an output of video clip creation module 108 may be at least one video clip that is excerpted from a video provided by the video source 102. Also, as detailed below a video clip generated by the video clip creation module 108 may be evaluated by video analysis module 105 to determine whether the video clip includes an object based on previously imprinting on the object that may then cause the video clip to be saved or deleted. If saved, the video clip may be sent via communications system 110 to various destinations. These destinations may include a user device that includes one or more video recording components to record video from which the video clip is created, a specific external device or devices, or may be a cloud storage destination, where cloud storage represents one or more locations and may be controlled by one or more computers that are hosted via a third party and are accessible to the user via a network such as the Internet. In some examples, a destination or destinations for receiving a video clip may be determined from user interface inputs 106.

In some examples, a cloud/server system 116 may be provided that is coupled to sensors 104 as shown in FIG. 1A. Cloud/server system 116 may include various storage, communications or data processing components arranged in a cloud architecture that may include a shared pool of computing resources. Sensors 104 may provide sensor information to the cloud/server system 116 that may be used to assist video clip creation module 108 in automated video editing of a given video. Also, cloud/server system 116 may assist video and sensor correlation module 107 with sensor information to imprint on an object and determine whether or not video components are or have been recording video including the object that has been imprinted upon. Cloud/server system 116 may output, for example, sensor information that includes analyzed sensor data to aid the video clip creation module 108 in identifying a sensor event that triggers creation of a video clip. The Cloud/server system may also connect user devices (not shown) to social media services in order to share video clips with other people. For example, a clip may be posted to a user's Facebook page or Vine account. In some embodiments the system may automatically post a video clip to a social media account or may automatically compile a clip for one or more users of the system to approve for posting.

In some examples, as shown in FIG. 1A, video clip creation module 108 may be coupled to both cloud/server system 116 and to sensors 104. Video clip creation module 108 may thus receive sensor data directly from sensors 104 and may also receive sensor information that includes analyzed sensor data from cloud/server system 116.

In some examples, sensors 104 that provide inputs to video clip creation module 108 or video or sensor correlation module 107 may be distributed across multiple wearable and non-wearable components located at or with an object. For example, in a given environment in which a video is recorded multiple wearable and non-wearable sensors may be linked to a device to receive sensor information to be exploited by video clip creation module 108 to create a video clip and then for video analysis module 105 to determine whether to save or delete the video clip.

In some examples, as shown in FIG. 1A, video analysis module 105 may include object recognition 105-*a*, marker detection 105-*b*, pattern analysis 105-*c* or motion analysis 105-*d* as features to enable video analysis module 105 to imprint on an object to determine whether video source 102 is recording video that includes the object. For example, a color for the object may use objection recognition 105-*a*, a pattern for the object may use pattern analysis 105-*c* (e.g., facial recognition of an object known to the system), a motion of the object may use motion analysis 105-*d* or a fiducial marker associated with the object may use marker detection 105-*b*. These features may be activated based on receiving imprinting information that includes an imprinting command. The imprinting command, for example, may indicate that a subject included in video recorded by video source 102 concurrently with receiving the imprinting command is the object.

According to some examples, an imprinting command may be received via user interface inputs 106 and may include a first gesture input from a user of a video recording component that generates video source 102 or a second gesture input from the object. The first or second gestures may include, but are not limited to, a recognizable hand signal (e.g., index finger and thumb forming a circular shape) or body gesture (waving arms over head). The imprinting command may also be a voice-based input from the user or from the object. The imprinting command may also be an input device command from the user. The input device may include a mouse, keyboard, keypad, voice input/output, touchpad, or touch screen, or other known input device or component.

Figure 1B:
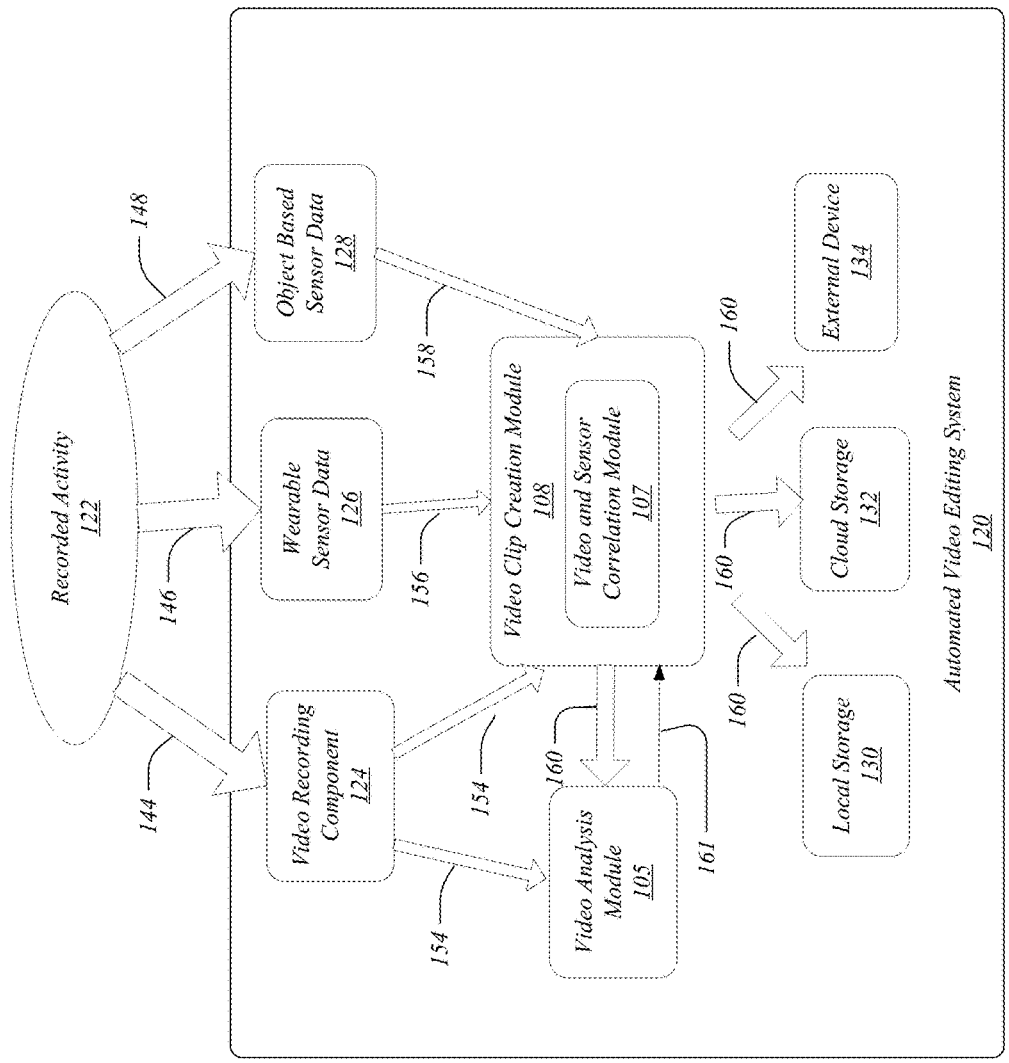
FIG. 1B illustrates an example of a second automated video editing system.

FIG. 1B illustrates a block diagram of operation of another automated video editing system 120. As shown in FIG. 1B, recorded activity 122 may represent any activity that is recorded by a device such as a video recording component. Recorded activity 122 may be a sporting event, a musical event, leisure activity, or other activity. Video recording component 124 (e.g., a video camera or video capture device) may receive recorded content 144 from the recorded activity 122, which may be composed of a video track and audio track in some examples. Wearable sensor data 126 may include wearable sensor data 146, which in one example may be altimeter data for an object wearing an altimeter during recorded activity 122. Object sensor data 128 may include object sensor data 148, which in one example may be accelerometer data tracking rapid movements of the object during recorded activity 122. Video 154 may be outputted from video recording component 124 that may include a video track and a video track time stamp. A video track time stamp may include a time entry for every video frame of a video track. Wearable sensor data 126 may output a sensor data stream 156, which may include altitude data recorded by a wearable sensor as a function of time. For example, altitude data entry is associated with a time stamp. Object sensor data 128 may output sensor data stream 158 which may include accelerometer data recorded by the object sensor 128 as a function of time. Thus, each accelerometer data entry may be associated with a time stamp. In some examples, respective time stamps may be generated by respective clocks at video recording component(s), wearable sensor(s) or object base sensor(s) that generated video recording component 124, wearable sensor data 126 and object based sensor data 128. These clocks may be synchronized based on a network based protocol including network time protocol (NTP). Synchronized clocks using NTP may enable devices or components having different types of clocks to be synchronized and thus enable video content 154 to be better synchronized with sensor data streams 156 or 158.

In operation the video clip creation module 108 may receive the video 154, sensor data stream 156, and sensor data stream 158, and may generate video clip 160, which is composed of at least one video clip. Video clip 160 may have a duration of, for example, one second, five seconds, six seconds, or other duration. Video clip generation module 108 may generate video clip 160 based upon a sensor event that is determined from the sensor data stream 156, sensor data stream 158, or both sensor data stream 156 and sensor data stream 158.

After generating video clip 160, video clip creation module 108 may send video clip 160 to video analysis module 105. In some examples, the object being recorded during recorded activity 122 may have been imprinted via an imprinting process as described above. Video analysis module 105 may determine whether video clip 160 includes the object based on the imprint on the object. For example, visual markers of the object learned or established during imprinting may enable video analysis module 105 to determine whether the object is included in at least a majority of video frames for the video content included in video clip 160. If video analysis module 105 determines video clip 160 includes the object, video analysis module 105 may cause video clip 160 to be saved. If video analysis module determines video clip 160 does not include the object, video analysis module 105 may cause video clip 160 to be deleted or discarded.

After a determination of whether video clip 160 is to be saved or deleted, video analysis module 105 may send indication 161 to video clip creation module 108 that indicates the determination. In some examples, if indication 161 indicates video clip 160 is to be saved then video clip 160 may be sent to various destinations, such as a local storage 130 that is resident on a device that contains the video clip creation module 108, or to cloud storage 132, or to an external device 134. In various examples, video clip 160 may be generated in real time as a video 154 is being recorded, while in other examples video 154 may be processed by a video clip creation module 108 at a time subsequent to when the video 154 is recorded.

In some examples, a system such as automated video editing system 120 may receive video recorded by one or more video recording components and may generate video clips from the recorded video either in real-time or subsequent to at least temporarily storing the recorded video.

Figure 2A:
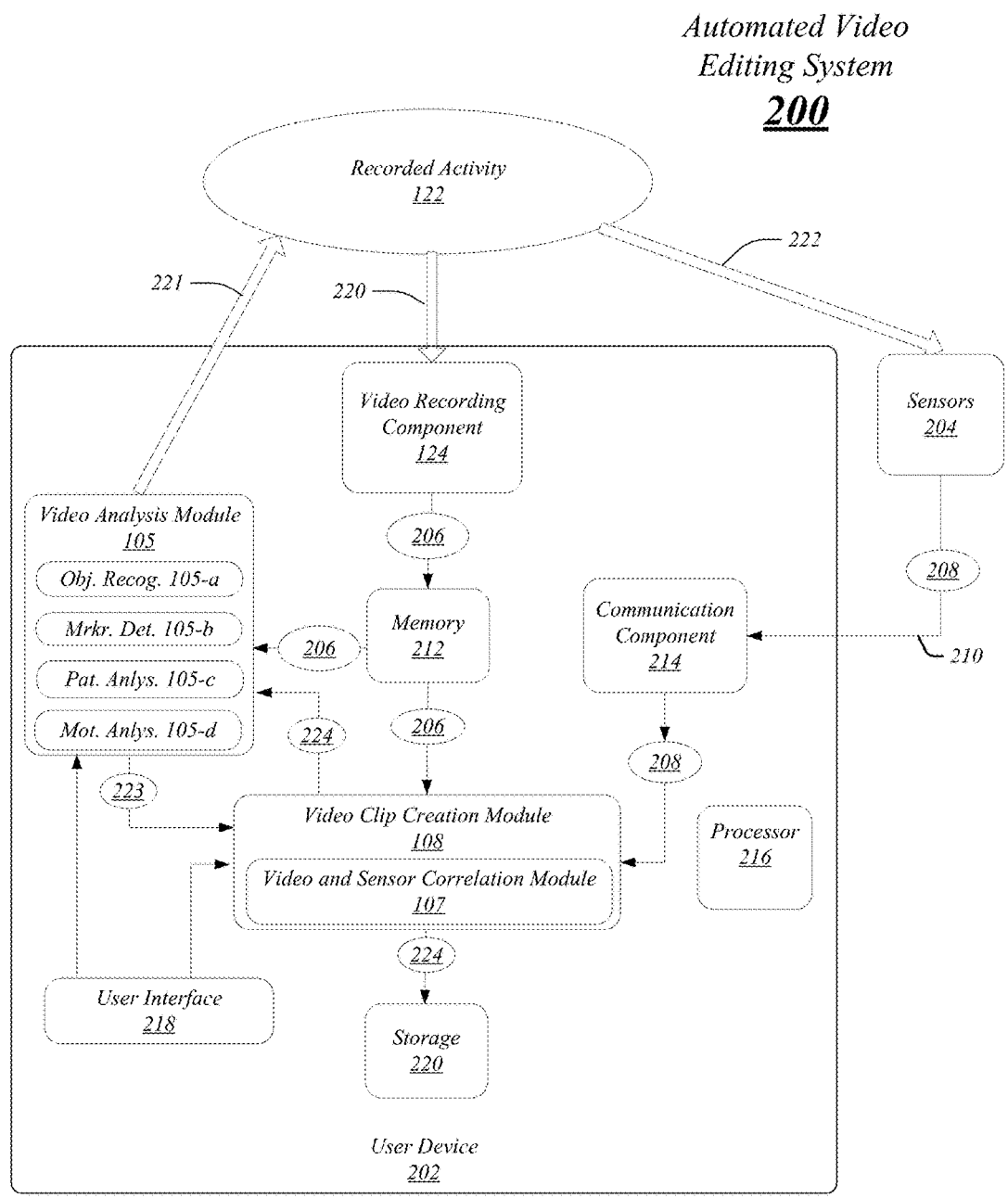
FIG. 2A illustrates an example of a third automated video editing system.

FIG. 2A depicts an example of an automated video editing system 200 that includes a user device 202 that includes a video recording component 124. User device 202 may be a video camera, cell phone, smartphone, tablet computer, wearable device, phablet, or other device. Also, as shown in FIG. 2A, video recording component 124 may be used to record video content 220 from recorded activity 122. Video 206 that includes video content 220 and a time stamp may be stored at least temporarily in memory 212 (e.g., a buffer memory). Over a same period as user device 202 records video content 220, sensors 204 may record sensor data 222 from recorded activity 122. Sensors 204 may output sensor information 208 that includes a time stamp for sensor data 222. The user device 202 may include a communication component 214 that is operative to receive sensor information 208 over a link 210, which may employ a known wireless technology in some examples. Video 206 may be forwarded to video analysis module 105. According to some examples, video analysis module 105 may utilize object recognition 105-a, marker detection 105-b, pattern analysis 105-c or motion analysis 105-d to determine that video recording component 124 is recording video from recorded activity 122 that includes the object. In other words, video analysis module 105 may base this determination on the imprint of the object that includes use of the detection or analysis features mentioned above. Video analysis module 105 may then cause indication 221 to be sent to the object that is now determined to be the subject or recorded activity 122. According to some examples, the indication may be an audio, visual or tactile indicator to alert the object that video recording component 124 is recording video from recorded activity 122 that includes the object.

According to some examples, as shown in FIG. 2A, sensor information 208 and video 206 may be forwarded to the video clip creation module 108. Video clip creation module 108 may then generate video clip 224. Video clip 224 may initially be sent to video analysis module 105. Video analysis module 105, as mentioned above, may determine whether the video clip includes the object based on the imprint on the object. Video analysis mode 105 may then send indication 223 to video clip creation module 108 to indicate whether video clip 224 is to be saved or deleted. If saved, video clip 224 may be saved at least temporarily at storage 220 or may be distributed to other destinations, as illustrated, for example, in FIG. 1B.

In some examples separate logic or circuitry, such as processor 216, may be operative on video analysis module 105 or video clip generation module 108 to assist in imprinting on an object, recognizing the object in recorded video 206, generation of video clip 224, determining whether to save or delete video clip 224 as well as the distribution of video clip output 224 should it be saved. As illustrated in the example of FIG. 2A, processor 216 may operate locally within user device 202. However, in other examples, a processor or other logic that assists in video clip generation, for example, may be located remotely from user device 202, and thus may be located remotely from video analysis module 105 or video clip generation module 108. In such circumstances the processor may perform certain tasks that assist in determining a sensor event as described more below.

According to some examples, as shown in FIG. 2A, user device 202 may also include a user interface 218. User interface 218 may include, but is not limited to, a mouse, a keyboard, a keypad, a voice input/output, a touchpad, or a touch screen, a touch pad or other type of input device or component. User interface 218 may transmit input to video analysis module 105 to assist in imprinting on the object that is to be the subject of recorded activity 122. User interface 218 may also transmit input to video clip creation module 108 to assist in generation of video clip 224, as well as the distribution of video clip 224 should video clip 224 be saved based on video analysis module 105's determination.

Figure 2B:
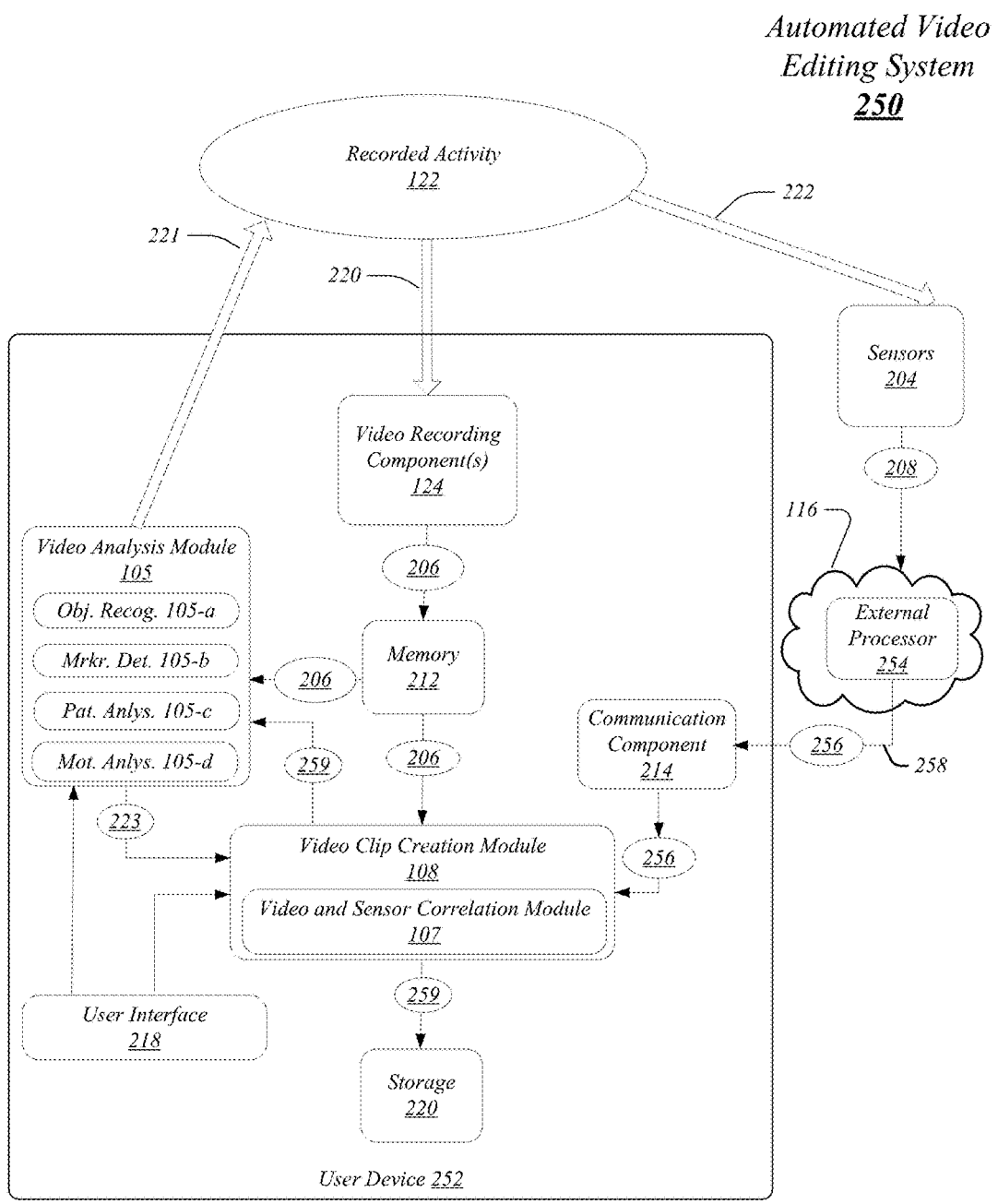
FIG. 2B illustrates an example of a fourth automated video editing system.

FIG. 2B shows an example of an automated video editing system 250 that includes a user device 252 that includes similar components to those of user device 202 shown in FIG. 2A. However, automated video editing system 250 may include sensors 204 that are coupled to an external processor 254 located in cloud/server system 116 to send sensor information 208, which may then be analyzed by external processor 254. The external processor 254 may then forward sensor information 256 over a link 258 to the user device 252, in which the sensor information 256 represents a result of analysis of the sensor data 208. The sensor information 256 and sensor data 208 may be received by video clip creation module 108, which generates video clip 259. Video clip 259 may then be sent to video analysis module 105 for a determination of whether video clip 259 is to be saved or deleted.

Figure 3:
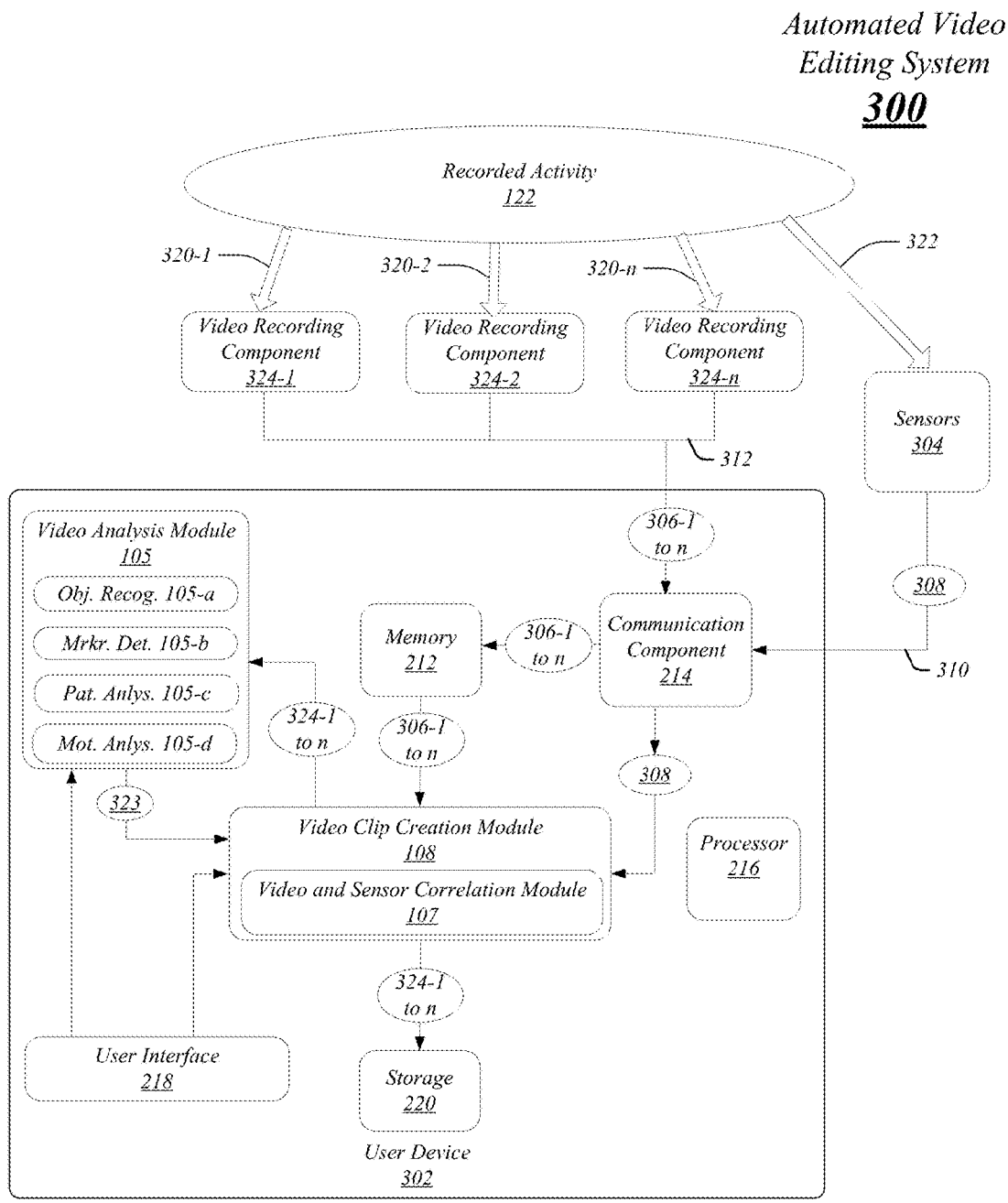
FIG. 3 illustrates an example of a fifth automated video editing system.

FIG. 3 shows an example of an automated video editing system 300 that includes a user device 302 that includes similar components to those of user devices 202 and 252 shown in FIGS. 2A-B. However, user device 302 does not include a video recording component. Rather, as shown in FIG. 3, video recording components 324-1 to 324-n, where n represents any whole integer greater than 2, may record video content 320-1 to 320-n from recorded activity 122. Video recording components 324-1 to 324-n may output respective video 306-1 to 306-n to user device 302 over link 312 coupled with communication component 214. In some examples, video recording components 324-1 to 324-n may be part of infrastructure cameras situated at various locations around or near recorded activity 122. For example, if recorded activity 122 is a team sporting event in an arena or stadium, video recording components 324-1 to 324-n may be situated throughout the arena and pointed towards the team sporting event.

According to some examples, sensors 304 may record or capture sensor data 322 from recorded activity 122. Sensors 304 may output sensor information 308 to user device 302 over link 310 coupled with communication component 214. Using the example mentioned above for a team sporting event in an arena or stadium, sensors 304 may be attached (e.g., wearable) or located with multiple objects located at or near recorded activity 122. Thus, for this example, sensor information 308 may include sensor data 322 from multiple sensors located with multiple objects.

In some examples, video 306-1 to 306-n may each have respective time stamps and may be stored at least temporarily in memory 212. Over a same period as video recording components 324-1 to 324-n records respective video content 320-1 to 320-n, sensors 302 may record sensor data 322 from recorded activity 122. Sensors 304 may then output sensor information 308 that includes respective time stamps recorded from the multiple sensors located with multiple objects.

According to some examples, as shown in FIG. 3, sensor information 308 and video 306-1 to 306-n may be forwarded to a video and sensor correlation module 107 located with video clip creation module 108. For these examples, video and sensor correlation module 107 may correlate sensor data included in sensor information 308 with video 306-1 to 306-n to determine what sensor data goes with what object included in video 306-1 to 306-n. For example video and sensor correlation module 107 may have identifier information such as sensor identifiers that are known to be assigned to particular objects in the video. The particular objects may be identified by similar analysis or detection features as described above for video analysis module 105. For example, if objects are individual players of a team event, a jersey or kit number may be assigned to players as well as a color of the jersey or kit. Video and sensor correlation module 107 may then be able to match up video 306-1 to 306-n with sensor data generated from sensors assigned to respective objects. A given sensor identifier assigned to a given object (e.g., a player) may be a form of imprinting information of the given object to determine whether video recording components 324-1 to 324-n are recording video that includes the given object. Video clip creation module 108 may then generate video clips 324-1 to 324-n that may now include at least portions of video content 320-1, 320-2 and 320-n that are synchronized with respective sensor data 322 recorded from individual sensors located at or with respective objects from recorded activity 122. Video and sensor correlation module 107 may then determine whether a given object is included in one or more video clips 324-1 to 324-n based on the imprint to the given object. Based on this determination, video and sensor correlation module 107 may cause all or at least some of video clips 324-1 to 324-n to be deleted or saved. If saved, one or more of video clips 324-1 to 324-n may be saved at least temporarily at storage 220 or may be distributed to other destinations.

In alternative examples, rather than video and sensor correlation module 107 determining what video clips are saved or deleted, video clips 324-1 to 324-n may be sent to video analysis module 105 for that determination. For these examples, video analysis module 105 may have received imprinting information (e.g., jersey number, color, markers, pattern/facial recognition, etc.) to determine whether a given object is included in one or more of video clips 324-1 to 324-n. Video analysis module 105 may employ recognition, detection or analysis features as mentioned above to determine whether the given object is included in the one or more video clips. According to some examples, if multiple video clips are determined to include the given object, video analysis module 105 may also determine which video clip from among video clips 324-1 to 324-n includes the given object the most. In other words, identify the video clip having the most unobstructed view of the given object in the video clip. Video analysis module 105 may then send indication 123 to video clip creation module 108 to indicate that all or at least some of video clips 324-1 to 324-n are to be deleted or saved. If saved, one or more of video clips 324-1 to 324-n may be saved at least temporarily at storage 220 or may be distributed to other destinations.

Figure 4A:
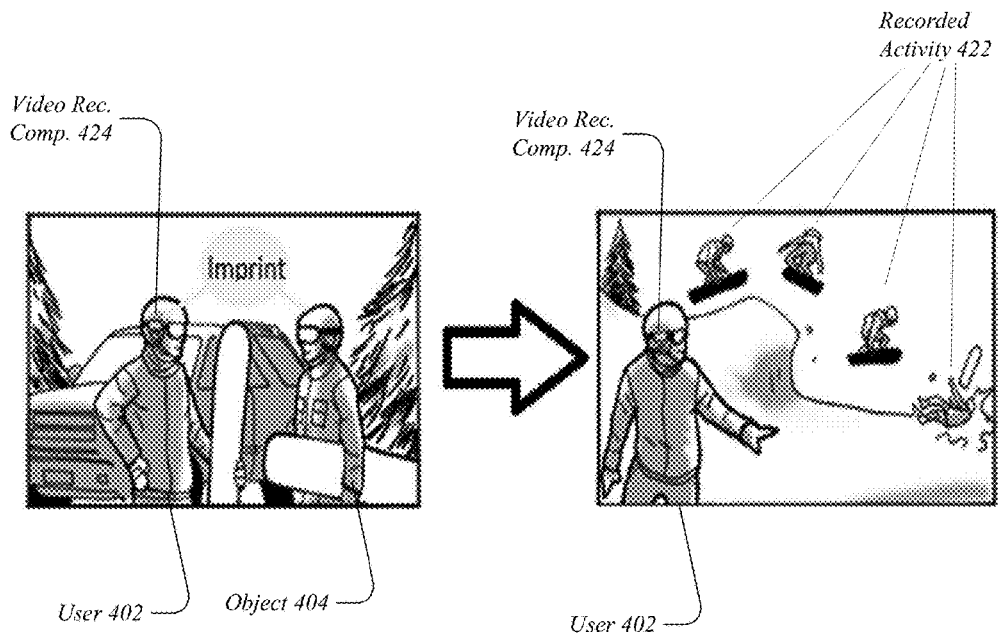
FIGS. 4A-B illustrate example scenarios for implementing automated video editing.
Figure 4B:
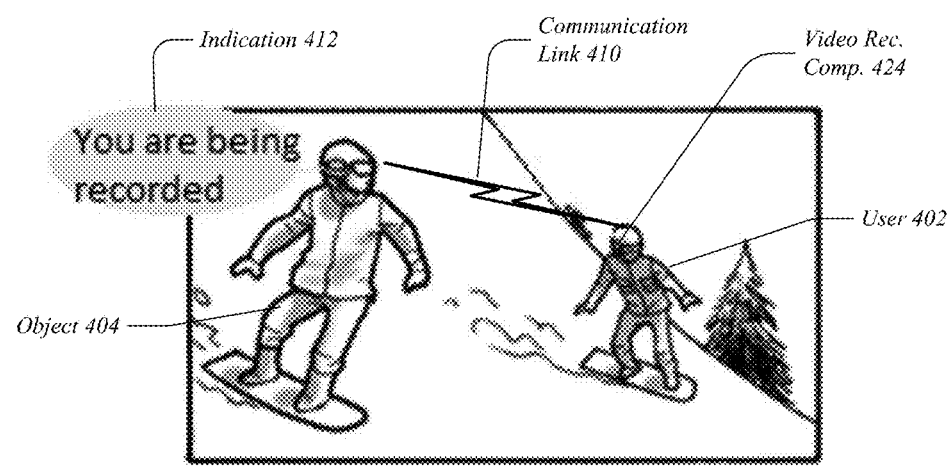
Figure 5:
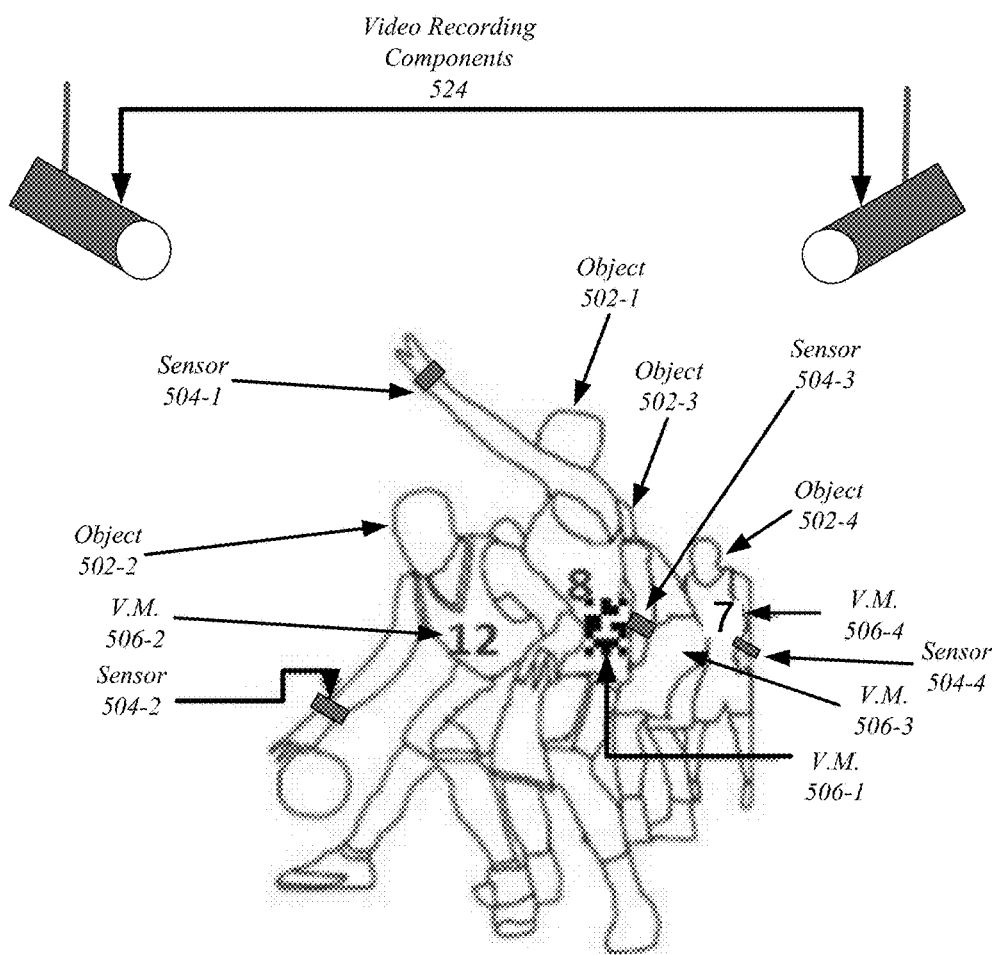
FIG. 5 illustrates another example scenario for implementing automated video editing.

For the purposes of illustration, in FIGS. 4A, 4B and 5 there are illustrated various scenario for implementing automated video editing in accordance with examples of the disclosure. Turning now to FIG. 4A, a user 402 having a head-mounted video recording component 424 is shown as visually imprinting on object 404. Object 404 may include various wearable sensors (not shown). As mentioned above, for various automated video editing systems shown in FIGS. 1-3, this imprinting may be used to determine whether video recording component 424 is recording video from recorded activity 422. For example, although FIG. 4A shows user 402 looking towards recorded activity 422. User 402 may have been distracted and looked away for a large portion of recorded activity 422 and only looked back at object 404 at the crash landing portion and thus may have missed the jump portion of recorded activity 422. However, the video clip generated may mostly include video content of what distracted user 402 (e.g., a downhill object) and thus may be selected for deletion as mentioned above for the automated video editing systems shown in FIGS. 1-3.

Turning now to FIG. 4B, object 404 may have a communication link 410 (e.g., a wireless communication link) with user 402. In some examples, user 402 may have video recording component 424 recording object 404. For these examples, a user device (not shown) at user 402 such as user device 202 may include modules (e.g., video analysis module 105) to determine when video recording component 424 is recording video that includes object 404 based on the imprint on object 404. For these examples, as shown in FIG. 4B, an indication may be sent to object 404 to indicate that video recording component 424 is recording object 404. Object 404 may then attempt a jump or do a trick knowing that an interesting video clip may be generated and saved that has video content including object 404 completing the jump or trick.

Turning now to FIG. 5, objects 502-1 to 502-4 may each have respective wearable sensors 504-1 to 504-4. Also, as shown in FIG. 5, objects 502-1 to 502-4 may have respective visual markers 506-1 to 506-4. In some examples, visual marker 506-1 may be a particular pattern on the jersey of object 502-1. Visual markers 506-2 and 506-4 may be player numbers assigned to respective objects 502-2 and 502-4. Visual marker 506-3 may be a color of the jersey or shorts worn by object 502-3.

In some examples, video recording components 524 may be recording video from recording event 522. Recording event 522 may be a basketball game and video recording components 524 may include various cameras situated around a basketball court. For these examples, video content recorded by video recording components 542 as well as sensor information from sensors 504-1 to 504-4 may be sent to a user device such as user device 302. As mentioned above for user device 302 shown in FIG. 3, video clips automatically generated based on sensor events may be deleted or saved based on an imprint to an object. For example, object 502-2 having visual marker 506-2 may be the given object that has been imprinted upon based on imprinting information that assigns sensor 504-2 to an object having a jersey number identified as 12. Therefore, only video clips including the given object recognized in the video content as having a jersey number identified as 12 are saved.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
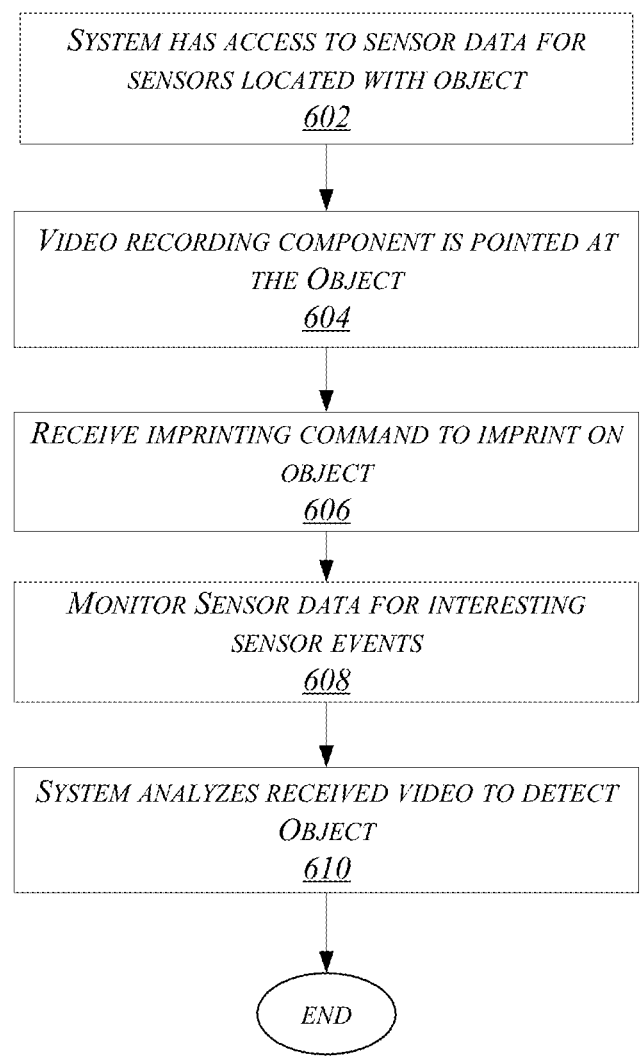
FIG. 6 shows an example first logic flow.

FIG. 6 illustrates an example first logic flow 600. In some examples, logic flow 600 may be implemented by a system (e.g., a user device) configured to imprint on an object for recorded video and select video clips for saving or deleting based the imprint. At block 602 the system has access to sensor data for sensors located with the object. The sensors located with the object, for example, may include one or more wearable sensors.

At block 604, a video recording component is pointed at the object. In some examples, the video recording component may be part of the system or may be coupled to the system through a communication component.

At block 606, receive imprinting command to imprint on the object. In some examples, the imprinting command may be included in imprinting information received by the system. The imprinting command may indicate that a subject included in video recorded by the video recording component concurrent with receiving the imprinting command is the object.

At block 608, monitor sensor data for interesting sensor events. In some examples, the sensors located with the object may include one or more of an accelerometer, a gyrometer, a position detector, an altimeter, an audio detector, a proximity sensor or a humidity sensor. For these examples, the system may monitor the sensor data generated by the sensors located with the object to identify such interesting sensor events as a rapid acceleration, a rapid change of direction, position or altitude or a change in detected audio levels. Examples are not limited to these examples of interesting sensor events.

At block 610, system analyzes received video to detect object. In some examples, the received video may be analyzed following generation of a video clip based on an interesting sensor event. Video content in the video clip may be analyzed to determine whether the video clip includes the object based on the imprint on the object mentioned above at block 610. The logic flow 600 then comes to an end.

Figure 7:
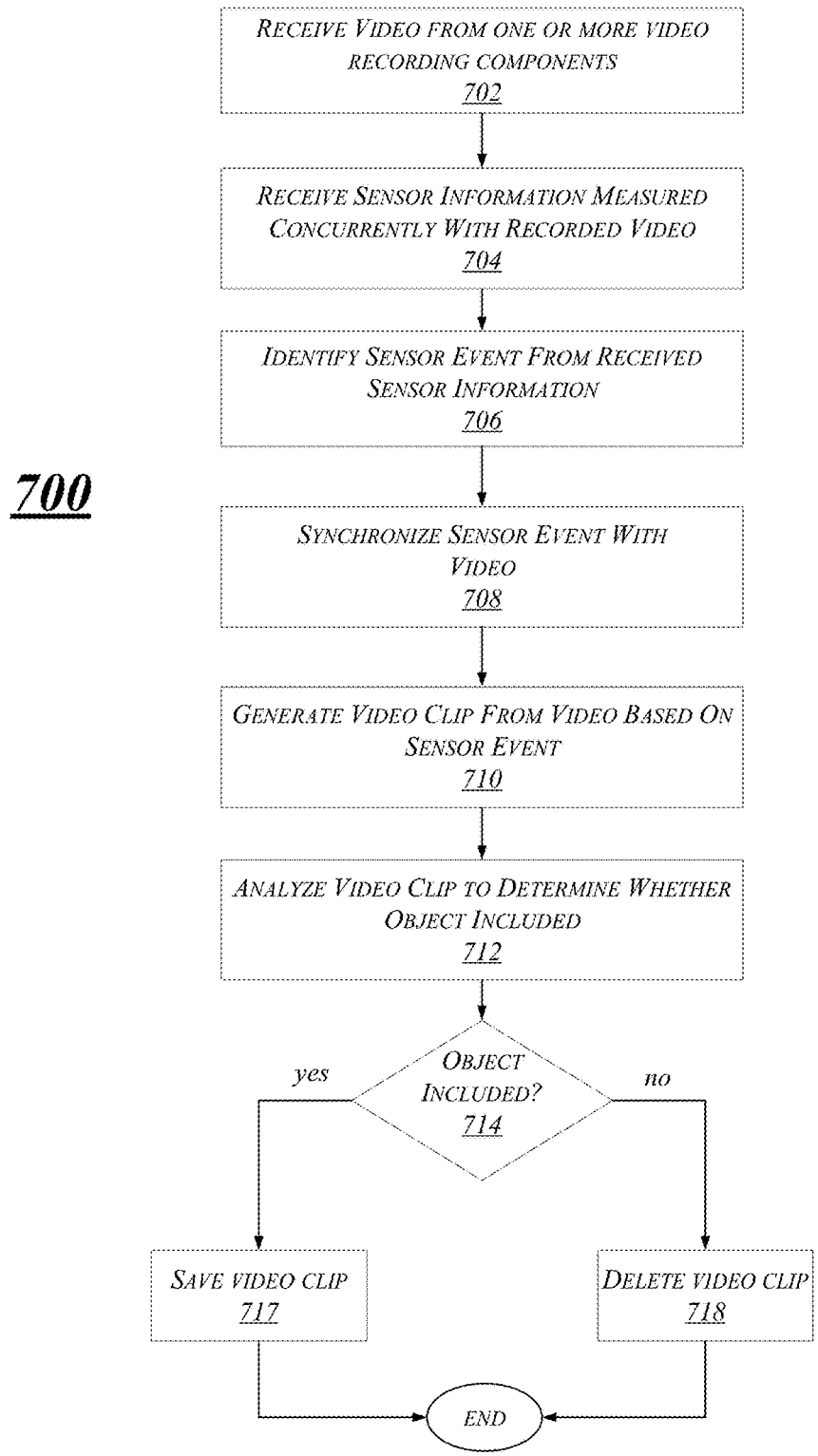
FIG. 7 shows an example second logic flow.

FIG. 7 illustrates an example second logic flow 700. In some examples, the logic flow 700 may be implemented in a user device that is configured to record a video. At block 702 recorded video is received. The recorded video may be received in real-time such that a first portion of the recorded video is received while a second portion is being recorded or is yet to be recorded.

At block 704, sensor information is received that is based on sensor data measured concurrently with the recording of the recorded video. In one example the sensor information may be a sensor data stream that is received from a sensor in real time as the sensor data is being measured.

At block 706 a sensor event is identified from the received sensor information. The identification of a sensor event may be based upon any suitable criterion related to the sensor information such as a change in a value of sensor data as a function of time. The sensor event may be time stamped such that a sensor event time stamp indicating the time at which the sensor event occurs is provided in the sensor information.

At block 708, the sensor event is synchronized with the recorded video. For example the recorded video may include a video track time stamp that is used to synchronize the video to the sensor event by identifying an instance in the video that corresponds to the sensor event time stamp.

At block 710 a video clip is generated based upon the sensor event. The video clip may be created from a portion of the recorded video that overlaps the sensor event time stamp.

At block 712 analyze video clip to determine whether object included. As mentioned above for logic flow 600, analysis of the video clip may be based on imprinting on the object.

At decision block 714 object included? In some examples, based on the imprinting on the object it may be determined whether the video clip includes the object. Imprinting on the object may include visually imprinting on the object by identifying one or more visual markers of the object for use to determine whether the one or more video recording components are recording video that includes the object. If the object is determined to be included, the flow proceeds to block 716. If not, the flow proceeds to block 718.

At block 716 save video clip. In some examples, the video clip may be saved at a local storage at a user device and/or may be sent to a remote storage device. Logic flow 700 may then come to an end.

At block 718 delete video clip. In some examples, the video clip is deleted or discarded because the object was determined to not be included in the vide clop and hence the video clip may be of low interest. Logic flow 700 may then come to an end.

Figure 8:
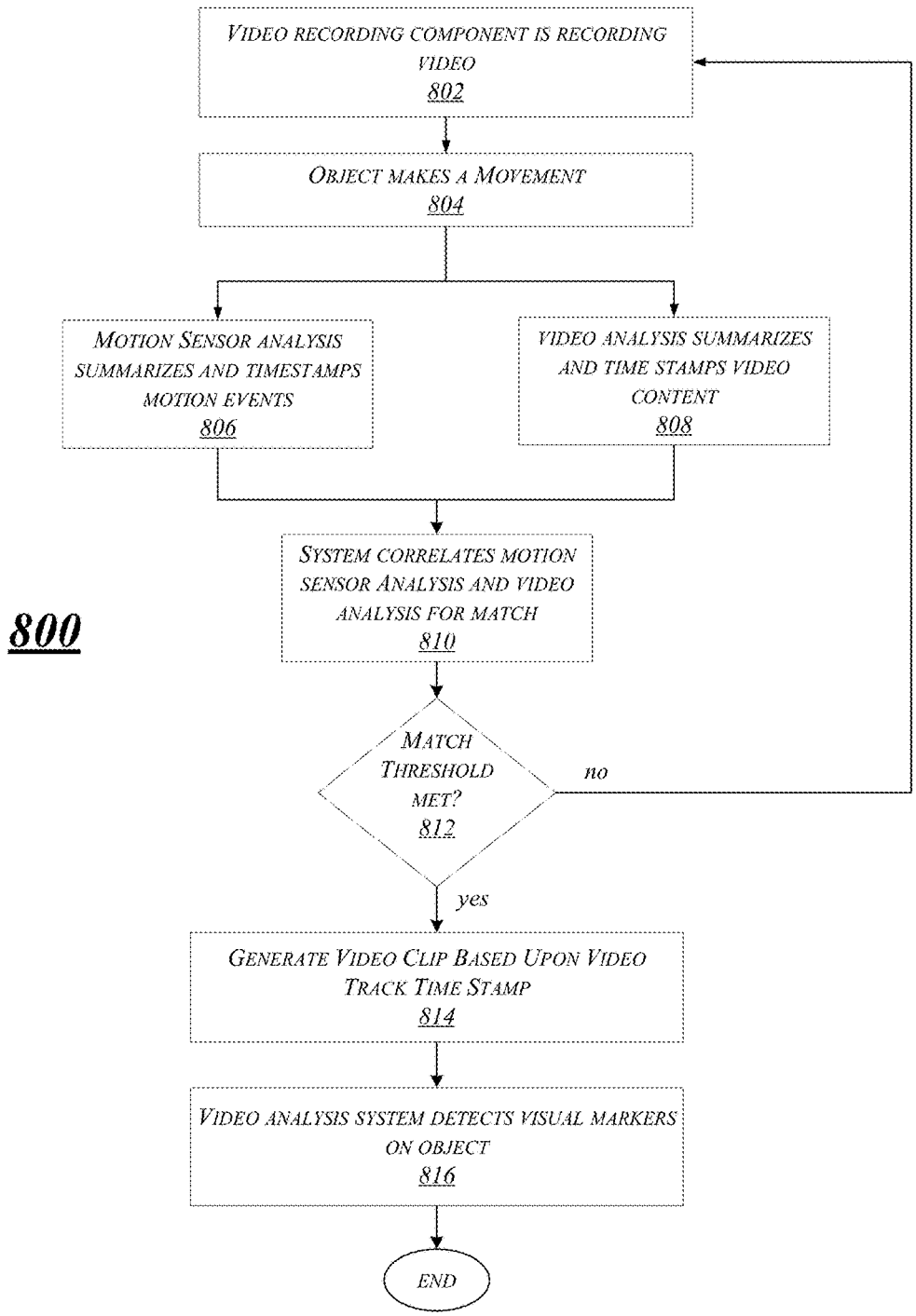
FIG. 8 shows an example third logic flow.

FIG. 8 illustrates an example third logic flow 800. In some examples, the logic flow 800 may be implemented in a user device that is configured to record a video. At block 802 video recording component is recording video.

At block 804 object makes a movement. In some examples, the object may be desired subject of the video recorded by the video recording component. For these examples, the object may be located with or near sensors capable of tracking movement or motion of the object.

At block 806 motion sensor analysis summarizes and timestamps motion events. In some examples, the motion sensor analysis may be based on sensor data received from the sensors capable of tracking movement or motion of the object.

At block 808 video analysis summarizes and time stamps video content. In some examples, one or more video recording components recording video content from a recorded activity may send video. This video may have video frames individually time stamped.

At block 810 system correlates motion sensor analysis and video analysis for match. In some examples, if multiple video recording components may have recorded video of the object and possible additional objects. The system to correlate motion sensor analysis and video analysis may be determine which video content can be matched with which sensor data. This may include using imprinting information to match the object in video content with sensor information having sensor data for a sensor assigned to the object.

At decision block 812 match threshold met? In some examples, a match threshold may include one or more visual markers to be identified in the video content that are known to be associated with the object are matched to a threshold number of sensor data points in order to acceptably correlate motion sensor data with the video content. If the match threshold is met, the flow proceeds to block 814. Otherwise the flow moves to block 802.

At block 814 generate video clip based upon video track time stamp. In some examples, a video clip may be generated based on the motion sensor event that includes video content form the video that is synchronized to this motion sensor event.

At block 816 video analysis system detects visual markers on the object to determine whether to save or delete the video clip. In some examples, the visual markers may be included in the imprinting information mentioned above at block 810 when correlating the motion sensor analysis with video analysis. In other examples, the visual markers may be based on imprinting information obtained via an imprint on the object that was previously obtained in an imprint operation. The imprint operation may be implemented in a similar manner as mentioned above for flow 600 shown in FIG. 6. Logic flow 800 may then come to an end. Subsequently to the generation and saving of a video clip, the system may post the video to a social network via the Cloud/server connection.

Figure 9:
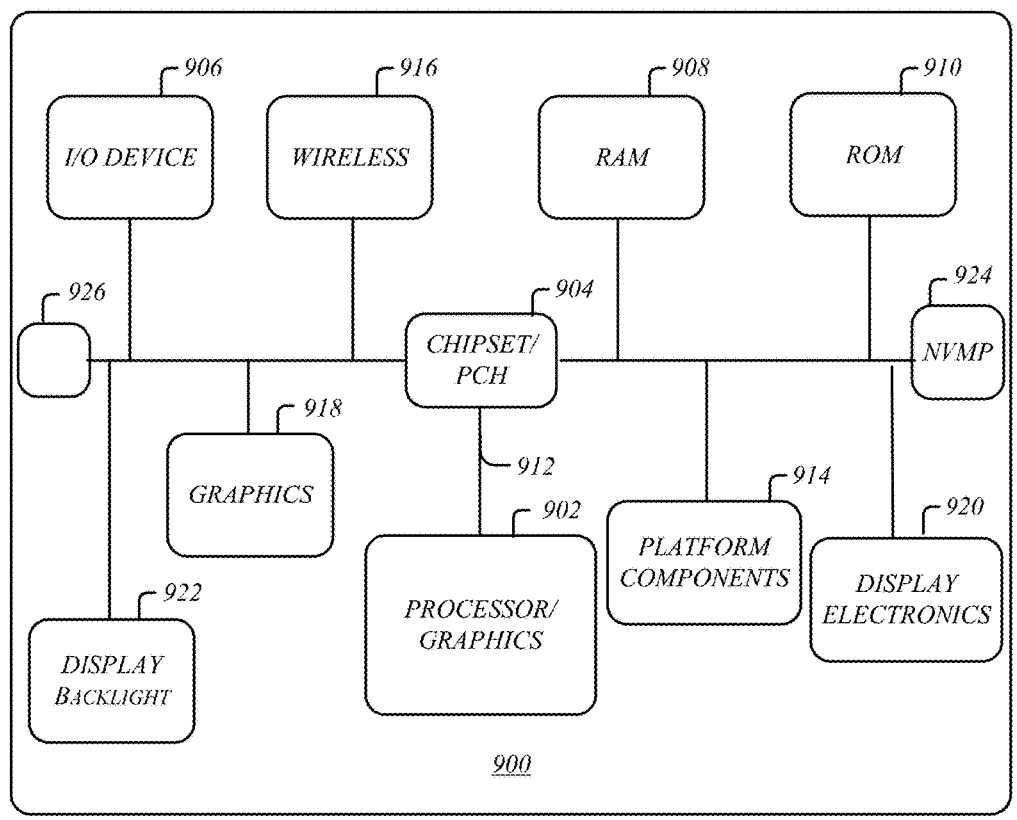
FIG. 9 illustrates a diagram of an example system architecture.

FIG. 9 is a diagram of an example system. In some examples, as shown in FIG. 9, the system includes a system 900, which may include various elements. For instance, FIG. 9 shows that system (platform) 900 may include a processor/graphics core, termed herein processor 902, a chipset/platform control hub (PCH), termed herein chipset 904, an input/output (I/O) device 906, a random access memory (RAM) (such as dynamic RAM (DRAM)) 908, and a read only memory (ROM) 910, display electronics 920, display backlight 922, and various other platform components 914 (e.g., a fan, a crossflow blower, a heat sink, DTM system, cooling system, housing, vents, and so forth). System 900 may also include wireless communications chip 916 and graphics device 918, non-volatile memory port (NVMP) 924, and antenna 926. The examples, however, are not limited to these elements.

As shown in FIG. 9, I/O device 906, RAM 908, and ROM 910 are coupled to processor 902 by way of chipset 904. Chipset 904 may be coupled to processor 902 by a bus 912. Accordingly, bus 912 may include multiple lines.

Processor 902 may be a central processing unit comprising one or more processor cores and may include any number of processors having any number of processor cores. The processor 902 may include any type of processing unit, such as, for example, CPU, multi-processing unit, a reduced instruction set computer (RISC), a processor that have a pipeline, a complex instruction set computer (CISC), digital signal processor (DSP), and so forth. In some examples, processor 902 may be multiple separate processors located on separate integrated circuit chips. In some examples processor 902 may be a processor having integrated graphics, while in other examples processor 902 may be a graphics core or cores. Commands can be provided to processor 902, for example, through keyboard, touch screen interaction, gestures, facial expressions, and sounds.

The following examples pertain to further embodiments.

EXAMPLE 1

An example apparatus may include an interface to receive sensor information from one or more sensors located with an object. The apparatus may also include a video clip creation module operatively coupled with the interface. The video clip creation module may identify a sensor event from the sensor information, and automatically generate a video clip from a video file or a video stream based on the sensor event. The apparatus may also include a video analysis module operatively coupled with the video clip creation module, the video analysis module to determine whether the video clip includes the object based on an imprint associated with the object, and to manage storage of the video clip based on the determination.

EXAMPLE 2

The apparatus of example 1, the imprint associated with the object may include the video analysis module to identify one or more visual markers of the object for use to determine whether the video file or video stream includes the object.

EXAMPLE 3

The apparatus of example 2, the one or more visual markers may include a fiducial marker associated with the object, a color for the object, a pattern for the object or a motion of the object.

EXAMPLE 4

The apparatus of example 2, the video analysis module may identify the one or more visual markers responsive to receiving an imprinting command that indicates that a subject included in a given video stream concurrent with receiving the imprinting command is the object.

EXAMPLE 5

The apparatus of example 4, the video analysis module may receive the imprinting command via at least one of a first gesture input from a user of the one or more video recording components, a second gesture input from the object, a first voice-based input from the user, a second voice-based command from the object or an input device command from the user.

EXAMPLE 6

The apparatus of example 1, the video analysis module may determine whether the video clip includes the object based on the imprint associated with the object comprises the video analysis module to determine whether the object is included in a majority of video frames included in the video clip.

EXAMPLE 7

The apparatus of example 1 may also include a video and sensor correlation module operatively coupled with the video analysis module and the interface. For these examples, the video and sensor correlation module may enhance the imprint associated with the object based on the video file or the video stream being recorded by multiple video recording components. The video and sensor correlation module may determine whether the video file or the video stream indicates at least one of the multiple recording components has recorded the video file or is recording the video stream that includes the object based on a correlation of sensor data received from the one or more sensors with the video file or the video stream recorded concurrently with the sensor data by the multiple recording components.

EXAMPLE 8

The apparatus of example 1, the video analysis module may cause an indication to be sent to the object that indicates that a video recording component recording the video file or video stream includes the object based on the imprint associated with the object.

EXAMPLE 9

The apparatus of example 8, the indication may include at least one of an audio, visual or tactile indicator to alert the object that the video recording component is recording video that includes the object.

EXAMPLE 10

The apparatus of example 1, the one or more sensors located with the object may include one or more sensors attached to the object or worn by the object.

EXAMPLE 11

The apparatus of example 10, the one or more sensors attached to the object or worn by the object may include one or more of an accelerometer, a gyrometer, a position detector, an altimeter, an audio detector, a proximity sensor or a humidity sensor.

EXAMPLE 12

The apparatus of example 1, the video clip creation module may synchronize the video file or video stream to the sensor event based on identifying a first time stamp of sensor data associated with the sensor event and generating the video clip according to a second time stamp of the video file or video stream, the first time stamp and second time stamp correspond to a same instance.

EXAMPLE 13

The apparatus of example 12, the first time stamp and the second time stamp may be generated by respective clocks located with the one or more sensors and one or more video recording components that recorded the video file or video stream. The respective clocks may be synchronized based on a protocol including network time protocol (NTP).

EXAMPLE 14

The apparatus of example 1, the video clip creation module may identify the sensor event and automatically generate the video clip based on the sensor event when sensor data included in the sensor information matches a predetermined criterion.

EXAMPLE 15

The apparatus of example 1 may also include a memory to at least temporarily store the video file or video stream.

EXAMPLE 16

An example method may include receiving sensor information from one or more sensors located with an object. The method may also include identifying a sensor event from the sensor information and automatically generating a video clip from a video file or a video stream based on the sensor event. The method may also include determining whether the video clip includes the object based on an imprint associated with the object and managing storage of the video clip based on the determination.

EXAMPLE 17

The method of example 16, the imprint associated with the object may include identifying one or more visual markers of the object for using to determine whether the video file or video stream includes the object.

EXAMPLE 18

The method of example 17, the one or more visual markers may include a fiducial marker associated with the object, a color for the object, a pattern for the object or a motion of the object.

EXAMPLE 19

The method of example 16, identifying the one or more visual markers responsive to receiving imprinting information that indicates that a subject included in a given video stream concurrent with receiving the imprinting command is the object. The method may also include receiving the imprinting command via at least one of a first gesture input from a user of the one or more video recording components, a second gesture input from the object, a first voice-based input from the user, a second voice-based command from the object or an input device command from the user.

EXAMPLE 20

The method of example 16, determining whether the video clip includes the object based on the imprint associated with the object comprises the object being included in a majority of video frames included in the video clip.

EXAMPLE 21

The method of example 16, enhancing the imprint associated with the object based on the video file or video stream being recorded by multiple recording components. For these examples, enhancing the imprint may include determining whether the video file or the video stream indicates at least one of the multiple recording components has recorded the video file or is recording the video stream that includes the object based on a correlation of sensor data with the video file or the video stream recorded concurrently with the sensor data by the multiple recording components.

EXAMPLE 22

The method of example 16 may also include sending an indication to the object to indicate that a video recording components is recording video that includes the object based on the imprint associated with the object.

EXAMPLE 23

The method of example 22, the indication may include at least one of an audio, visual or tactile indicator to alert the object that the video recording components is recording video that includes the object.

EXAMPLE 24

The method of example 16, the one or more sensors located with the object may include one or more sensors attached to the object or worn by the object.

EXAMPLE 25

The method of example 24, the one or more sensors attached to the object or worn by the object may include one or more of an accelerometer, a gyrometer, a position detector, an altimeter, an audio detector, a proximity sensor or a humidity sensor.

EXAMPLE 26

The method of example 16 may also include identifying a first time stamp of sensor data associated with the sensor event. The method may also include generating the video clip according to a second time stamp of the video file or video stream, the first time stamp and second time stamp correspond to a same instance in order to synchronize the video content to the sensor event.

EXAMPLE 27

The method of example 26, the first time stamp and the second time stamp may be generated by respective clocks located with the one or more sensors and one or more video recording components that recorded the video file or video stream. The respective clocks may be synchronized based on a protocol including network time protocol (NTP).

EXAMPLE 28

The method of example 16 may also include receiving the sensor information and automatically generating the video clip based on the sensor event when sensor data included in the sensor information matches a predetermined criterion.

EXAMPLE 29

An example at least one machine readable medium may include a plurality of instructions that in response to being executed by system at a computing platform cause the system to carry out a method according to any one of examples 16 to 28.

EXAMPLE 30

An example apparatus may include means for performing the methods of any one of examples 16 to 29.

EXAMPLE 31

An example at least one machine readable medium may include a plurality of instructions that in response to being executed by a system implemented cause the system to receive sensor information from one or more sensors located with an object. The instructions may also cause the system to identify a sensor event from the sensor information and automatically generate a video clip from a video file or a video stream based on the sensor event. The instructions may also cause the system to determine whether the video clip includes the object based on an imprint associated with the object and manage storage of the video clip based on the determination.

EXAMPLE 32

The at least one machine readable medium of example 31, the imprint associated with the object may include identifying one or more visual markers of the object for using to determine whether the video file or video stream includes the object.

EXAMPLE 33

The at least one machine readable medium of example 32, the one or more visual markers may include a fiducial marker associated with the object, a color for the object, a pattern for the object or a motion of the object.

EXAMPLE 34

The at least one machine readable medium of example 31, the instructions may also cause the system to identify the one or more visual markers responsive to receiving imprinting information that indicates that a subject included in a given video stream concurrent with receiving the imprinting command is the object, the imprinting command received via at least one of a first gesture input from a user of the one or more video recording components, a second gesture input from the object, a first voice-based input from the user, a second voice-based command from the object or an input device command from the user.

EXAMPLE 35

The at least one machine readable medium of example 31, the instructions may also cause the system to determine whether the video clip includes the object based on the imprint associated with the object comprises the object being included in a majority of video frames included in the video clip.

EXAMPLE 36

The at least one machine readable medium of example 31, the instruction may also cause the system to enhance the imprint associated with the object based on the video file or video stream being recorded by multiple recording components. The system to enhance the imprint includes a determination of whether the video file or the video stream indicates at least one of the multiple recording components has recorded the video file or is recording the video stream that includes the object based on a correlation of sensor data with the video file or the video stream recorded concurrently with the sensor data by the multiple recording components.

EXAMPLE 37

The at least one machine readable medium of example 31, the instructions may further cause the system to send an indication to the object to indicate that a video recording component is recording video that includes the object based on the imprint associated with the object.

EXAMPLE 38

The at least one machine readable medium of example 37, the indication may include at least one of an audio, visual or tactile indicator to alert the object that the at least one of the one or more video recording components is recording video that includes the object.

EXAMPLE 39

The at least one machine readable medium of example 31, the one or more sensors located with the object may include one or more sensors attached to the object or worn by the object.

EXAMPLE 40

The at least one machine readable medium of example 39, the one or more sensors attached to the object or worn by the object may include one or more of an accelerometer, a gyrometer, a position detector, an altimeter, an audio detector, a proximity sensor or a humidity sensor.

EXAMPLE 41

The at least one machine readable medium of example 31, the instructions may further cause the system to identify a first time stamp of sensor data associated with the sensor event and generate the video clip according to a second time stamp of the video file or video stream, the first time stamp and second time stamp correspond to a same instance in order to synchronize the video content to the sensor event.

EXAMPLE 42

The at least one machine readable medium of example 41, the first time stamp and the second time stamp may be generated by respective clocks located with the one or more sensors and one or more video recording components that recorded the video file or video stream. The respective clocks may be synchronized based on a protocol including network time protocol (NTP).

EXAMPLE 43

The at least one machine readable medium of example 31, the instructions may cause the system to receive the sensor information and automatically generate the video clip based on the sensor event when sensor data included in the sensor information matches a predetermined criterion.

EXAMPLE 44

An example system may include one or more video recording components. The system may also include an interface to receive sensor information from one or more sensors located with an object. The system may also include a video clip creation module operatively coupled with the one or more video recording components and the interface. The video clip creation module may identify a sensor event from the sensor information, and automatically generate a video clip from a video file or a video stream recorded by the one or more video recording components based on the sensor event. The system may also include a video analysis module operatively coupled with the video clip creation module. The video analysis module may determine whether the video clip includes the object based on an imprint associated with the object, and to manage storage of the video clip based on the determination.

EXAMPLE 45

The system of example 44, the imprint associated with the object may include the video analysis module to identify one or more visual markers of the object for use to determine whether the video file or video stream includes the object.

EXAMPLE 46

The system of example 45, the one or more visual markers may include a fiducial marker associated with the object, a color for the object, a pattern for the object or a motion of the object.

EXAMPLE 47

The system of example 44, the video analysis module may identify the one or more visual markers responsive to receiving an imprinting command that indicates that a subject included in a given video stream concurrent with receiving the imprinting command is the object.

EXAMPLE 48

The system of example 47, the video analysis module may receive the imprinting command via at least one of a first gesture input from a user of the one or more video recording components, a second gesture input from the object, a first voice-based input from the user, a second voice-based command from the object or an input device command from the user.

EXAMPLE 49

The system of example 44, the video analysis module to determine whether the video clip includes the object based on the imprint associated with the object may include the video analysis module determining whether the object is included in a majority of video frames included in the video clip.

EXAMPLE 50

The system of example 44, the video analysis module may cause an indication to be sent to the object that indicates that a video recording component recording the video file or video stream includes the object based on the imprint associated with the object.

EXAMPLE 51

The system of example 50, the indication may include at least one of an audio, visual or tactile indicator to alert the object that the at least one of the one or more video recording components is recording video that includes the object.

EXAMPLE 52

The system of example 44, the one or more sensors located with the object may include one or more sensors attached to the object or worn by the object.

EXAMPLE 53

The system of example 53, the one or more sensors may be attached to the object or worn by the object include one or more of an accelerometer, a gyrometer, a position detector, an altimeter, an audio detector, a proximity sensor or a humidity sensor.

EXAMPLE 54

The system of example 44, the video clip creation module may synchronize the video file or video stream to the sensor event based on identifying a first time stamp of sensor data associated with the sensor event and generating the video clip according to a second time stamp of the video file or video stream, the first time stamp and second time stamp correspond to a same instance.

EXAMPLE 55

The system of example 54, the first time stamp and the second time stamp may be generated by respective clocks located with the one or more sensors and the one or more video recording components. The respective clocks may be synchronized based on a protocol including network time protocol (NTP).

EXAMPLE 56

The system of example 44, the video clip creation module may identify the sensor event and automatically generate the video clip based on the sensor event when sensor data included in the sensor information matches a predetermined criterion.

The examples, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some examples, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The examples are not limited in this context.

Some examples may be described using the expression "one example" or "an example" or "in some examples" along with their derivatives. These terms mean that a particular feature, structure, or characteristic described in connection with the example is included in at least one example. The appearances of the phrase "in one example" in various places in the specification are not necessarily all referring to the same example. Further, some examples may be described using the expression "coupled" and "connected" along with their derivatives. These terms are not necessarily intended as synonyms for each other. For example, some examples may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
   an interface to:
      receive an imprinting command comprising gesture input from a user of a video recording component to generate an imprint of a subject in view of the video recording component concurrently with receiving the imprinting command, and
      receive sensor information from one or more sensors located with an object;
   a video clip creation module operatively coupled with the interface, the video clip creation module to identify a sensor event from the sensor information, and automatically generate a video clip from a video file or a video stream based on the sensor event; and
   a video analysis module operatively coupled with the video clip creation module, the video analysis module to:
      determine whether the video clip includes the object based on the imprint associated with the object,
      delete the video clip responsive to the video clip not including the object, and
      imprint the subject responsive to the imprinting command, the video analysis module to:
         determine one or more visual markers of the object, and
         generate the imprint comprising an indication that the subject is the object and the one or more visual markers.

2. The apparatus of claim 1, the imprint associated with the object for use to determine whether the video file or video stream includes the object.

3. The apparatus of claim 1, the one or more visual markers comprising at least one of a fiducial marker associated with the object, a color for the object, a pattern for the object or a motion of the object.

4. The apparatus of claim 1, the video analysis module to determine whether the video clip includes the object based on the imprint associated with the object comprises the video analysis module to determine whether the object is included in a majority of video frames included in the video clip.

5. The apparatus of claim 1, comprising:
   a video and sensor correlation module operatively coupled with the video analysis module and the interface, the video and sensor correlation module to enhance the imprint associated with the object based on the video file or the video stream being recorded by multiple video recording components,
   the video and sensor correlation module to determine whether the video file or the video stream indicates at least one of the multiple recording components has recorded the video file or is recording the video stream that includes the object based on a correlation of sensor data received from the one or more sensors with the video file or the video stream recorded concurrently with the sensor data by the multiple recording components.

6. The apparatus of claim 1, the one or more sensors located with the object include one or more sensors attached to the object or worn by the object.

7. The apparatus of claim 6, the one or more sensors attached to the object or worn by the object include one or more of an accelerometer, a gyrometer, a position detector, an altimeter, an audio detector, a proximity sensor or a humidity sensor.

8. The apparatus of claim 1, the video clip creation module to synchronize the video file or video stream to the sensor event based on identifying a first time stamp of sensor data associated with the sensor event and generating the video clip according to a second time stamp of the video file or video stream, the first time stamp and second time stamp correspond to a same instance.

9. The method of claim 8, the first time stamp and the second time stamp generated by respective clocks located with the one or more sensors and one or more video recording components that recorded the video file or video stream, the respective clocks synchronized based on a protocol including network time protocol (NTP).

10. The apparatus of claim 1, the user being different from the subject.

11. The apparatus of claim 1, the video analysis module to generate the imprint prior to capture of a video file or a video stream.

12. A method comprising:
   receiving an imprinting command comprising gesture input from a user of a video recording component to generate an imprint of a subject in view of the video recording component concurrently with receiving the imprinting command;
   imprinting the subject responsive to the imprinting command by:
      determining one or more visual markers of an object,
      generating the imprint comprising an indication that the subject is the object and the one or more visual markers;
   receiving sensor information from one or more sensors located with the object;
   identifying a sensor event from the sensor information;
   automatically generating a video clip from a video file or a video stream based on the sensor event;
   determining whether the video clip includes the object based on the imprint associated with the object; and
   deleting the video clip responsive to the video clip not including the object.

13. The method of claim 12, the imprint associated with the object for using to determine whether the video file or video stream includes the object.

14. The method of claim 12, comprising:
   sending an indication to the object to indicate that a video recording component is recording video that includes the object based on the imprint associated with the object, the indication including at least one of an audio, visual or tactile indicator to alert the object that the video recording components is recording video that includes the object.

15. The method of claim 12, receiving the sensor information and automatically generating the video clip based on the sensor event when sensor data included in the sensor information matches a predetermined criterion.

16. At least one non-transitory machine readable medium comprising a plurality of instructions that in response to being executed by a system cause the system to:
receive an imprinting command comprising gesture input from a user of a video recording component to generate an imprint of a subject in view of the video recording component concurrently with receiving the imprinting command;
imprinting the subject responsive to the imprinting command by:
determining one or more visual markers of an object,
generating the imprint comprising an indication that the subject is the object and the one or more visual markers;
receive sensor information from one or more sensors located with the object;
identify a sensor event from the sensor information;
automatically generate a video clip from a video file or a video stream based on the sensor event;
determine whether the video clip includes the object based on the imprint associated with the object; and
delete the video clip responsive to the video clip not including the object.

17. The at least one non-transitory machine readable medium of claim 16, the one or more visual markers comprising at least one of a fiducial marker associated with the object, a color for the object, a pattern for the object or a motion of the object.

18. The at least one non-transitory machine readable medium of claim 16, the imprinting command received via at least one of a first gesture input from a user of the one or more video recording components, a second gesture input from the object, a first voice-based input from the user, a second voice-based command from the object or an input device command from the user.

19. The at least one non-transitory machine readable medium of claim 16, the instruction to cause the system to enhance the imprint associated with the object based on the video file or video stream being recorded by multiple recording components, the system to enhance the imprint includes a determination of whether the video file or the video stream indicates at least one of the multiple recording components has recorded the video file or is recording the video stream that includes the object based on a correlation of sensor data with the video file or the video stream recorded concurrently with the sensor data by the multiple recording components.

20. A system comprising:
one or more video recording components;
an interface to:
receive an imprinting command comprising gesture input from a user of the one or more video recording components to generate an imprint of a subject in view of at least one of the one or more video recording components concurrently with receiving the imprinting command, and
receive sensor information from one or more sensors located with an object;
a video clip creation module operatively coupled with the one or more video recording components and the interface, the video clip creation module to identify a sensor event from the sensor information, and automatically generate a video clip from a video file or a video stream recorded by the one or more video recording components based on the sensor event; and
a video analysis module operatively coupled with the video clip creation module, the video analysis module to:
determine whether the video clip includes the object based on the imprint associated with the object,
delete the video clip responsive to the video clip not including the object, and
imprint the subject responsive to the imprinting command, the video analysis module to:
determine one or more visual markers of the object, and
generate the imprint comprising an indication that the subject is the object and the one or more visual markers.

21. The system of claim 20, the one or more visual markers comprising at least one of a fiducial marker associated with the object, a color for the object, a pattern for the object or a motion of the object.

22. The system of claim 20, the video analysis module to receive the imprinting command via at least one of a first gesture input from a user of the one or more video recording components, a second gesture input from the object, a first voice-based input from the user, a second voice-based command from the object or an input device command from the user.

23. The system of claim 20, the video analysis module to determine whether the video clip includes the object based on the imprint associated with the object comprises the video analysis module to determine whether the object is included in a majority of video frames included in the video clip.

24. The system of claim 20, the video analysis module to cause an indication to be sent to the object that indicates that a video recording component recording the video file or video stream includes the object based on the imprint associated with the object the indication including at least one of an audio, visual or tactile indicator to alert the object that the at least one of the one or more video recording components is recording video that includes the object.

* * * * *